United States Patent
Ishida (10) Patent No.: US 10,096,860 B2
(45) Date of Patent: Oct. 9, 2018

(54) METHOD OF MANUFACTURING NONAQUEOUS ELECTROLYTE SECONDARY BATTERY

(71) Applicant: TOYOTA JIDOSHA KABUSHIKI KAISHA, Toyota-shi, Aichi (JP)

(72) Inventor: Tomohiko Ishida, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 238 days.

(21) Appl. No.: 15/030,113

(22) PCT Filed: Oct. 21, 2014

(86) PCT No.: PCT/JP2014/005349
§ 371 (c)(1),
(2) Date: Apr. 18, 2016

(87) PCT Pub. No.: WO2015/064060
PCT Pub. Date: May 7, 2015

(65) Prior Publication Data
US 2016/0268626 A1  Sep. 15, 2016

(30) Foreign Application Priority Data
Oct. 29, 2013 (JP) .................... 2013-224607

(51) Int. Cl.
| | |
|---|---|
| *H01M 10/058* | (2010.01) |
| *H01M 10/0525* | (2010.01) |
| *H01M 10/44* | (2006.01) |
| *H01M 2/36* | (2006.01) |
| *H01M 4/587* | (2010.01) |
| *H01M 10/0566* | (2010.01) |
| *H01M 4/02* | (2006.01) |

(52) U.S. Cl.
CPC ........... *H01M 10/058* (2013.01); *H01M 2/36* (2013.01); *H01M 2/362* (2013.01); *H01M 2/365* (2013.01); *H01M 4/587* (2013.01); *H01M 10/0525* (2013.01); *H01M 10/446* (2013.01); *H01M 10/0566* (2013.01); *H01M 2004/027* (2013.01); *Y02T 10/7011* (2013.01)

(58) Field of Classification Search
CPC .. H01M 2/36; H01M 10/0525; H01M 10/058; H01M 4/587; H01M 10/446; H01M 2/365; H01M 2/362; H01M 10/0566; H01M 2004/027; Y02T 10/7011
See application file for complete search history.

(56) References Cited

U.S. PATENT DOCUMENTS

| | | | | |
|---|---|---|---|---|
| 6,485,862 | B1 * | 11/2002 | Yoshioka ............ | H01M 6/5072 29/623.2 |
| 2011/0159364 | A1 * | 6/2011 | Nishinaka ............ | H01M 4/621 429/217 |
| 2011/0195320 | A1 * | 8/2011 | Nishikoori .......... | H01M 2/0255 429/403 |
| 2013/0247364 | A1 * | 9/2013 | Fukatsu ............ | H01M 10/0404 29/623.2 |

FOREIGN PATENT DOCUMENTS

| | | |
|---|---|---|
| CN | 101861676 A | 10/2010 |
| CN | 103325989 A | 9/2013 |
| JP | 2000-090974 A | 3/2000 |
| JP | 2003-217669 A | 7/2003 |
| JP | 2013-197035 A | 9/2013 |
| WO | 00/41263 A1 | 7/2000 |

* cited by examiner

*Primary Examiner* — Muhammad S Siddiquee
(74) *Attorney, Agent, or Firm* — Sughrue Mion, PLLC (57) ABSTRACT

This invention provides a method of manufacturing a nonaqueous electrolyte secondary batteries which includes placing an electrode assembly in a hermetically sealable battery case, injecting a nonaqueous electrolyte into the battery case after the battery case has been set in a pressure-reduced state, and sealing the battery case under atmospheric pressure conditions. Sealing of the battery case is carried out before a given amount of the injected electrolyte completely impregnates the interior of the electrode assembly. As a result, the remaining nonaqueous electrolyte impregnates the interior of the electrode assembly after sealing, thereby making the pressure of voids within the battery case lower than atmospheric pressure.

6 Claims, 4 Drawing Sheets

(A) DURING ELECTROLYTE INJECTION
(B) DURING RELEASE OF REDUCED PRESSURE
(C) AFTER IMPREGNATION
(D) AFTER INITIAL CHARGING

METHOD OF MANUFACTURING NONAQUEOUS ELECTROLYTE SECONDARY BATTERY

CROSS REFERENCE TO RELATED APPLICATIONS

This is a National Stage of International Application No. PCT/JP2014/005349 filed Oct. 21, 2014, claiming priority based on Japanese Patent Application No. 2013-224607 filed Oct. 29, 2013, the contents of all of which are incorporated herein by reference in their entirety.

TECHNICAL FIELD

This invention relates to a method of manufacturing a secondary battery containing a nonaqueous electrolyte (nonaqueous electrolyte secondary battery).

BACKGROUND ART

Hermetically sealed secondary batteries containing a nonaqueous electrolyte, such as lithium ion secondary batteries and nickel hydride batteries have been used in recent years as portable power supplies for personal computers and handheld devices and also as power supplies for driving vehicles, because of their light weight and high energy density compared with existing batteries. In particular, lithium ion secondary batteries, which are lightweight and achieve a high energy density, are advantageously used as high-power sources of electricity for driving vehicles such as electric cars and hybrid cars.

When such sealed secondary batteries are used under harsh conditions such as in on-board applications (specifically, when stored a long time in a high-temperature environment or repeatedly charged and discharged at a high power density), the battery internal pressure can be rose unnecessarily on account of the volumetric expansion of gases remaining within the battery case, the formation of gases due to self-discharge of the battery, and increases in the vapor pressure of the electrolyte solution. Also, in lithium ion secondary batteries that use a carbon material, particularly a graphite material, as the component of negative electrode, the manufacturing process (e.g., at the time of preliminary charging which serves as an initial charging step) are sometimes accompanied by gas formation; the gases that form during such initial charging may likewise cause a rise in the battery internal pressure. Such a rise in the battery internal pressure is undesirable because it may cause a pressure sensing-type current interrupt device (CID) or a gas release valve to malfunction during normal use, or it may became a major factor lowering the long-term reliability of the airtightness of junctional region such as gas release valves and external connection terminals.

Up until now, such problems have been dealt with using such measures as placing the interior of the battery case during and after preliminary charging in a pressure-reduced state following electrolyte injection so as to remove gases that form during preliminary charging, and sealing the battery case (typically, the electrolyte injection hole) (see Patent Literature 1 and 2). In addition, Patent Literature 3 discloses art for injecting a nonaqueous electrolyte into a pressure-reduced battery case.

CITATION LIST

Patent Literature

PTL 1: Patent Literature 1: Japanese Patent Application Laid-open No. 2000-090974

PTL 2: Patent Literature 2: WO 00/41263

PTL 3: Patent Literature 3: Japanese Patent Application Laid-open No. 2003-217669

SUMMARY OF INVENTION

However, when treatment that forcibly reduces the pressure within the battery case at a stage following injection of the nonaqueous electrolyte into the battery case is carried out, due to vaporization of the solvent making up the nonaqueous electrolyte, changes arise in the nonaqueous electrolyte composition (such as the compositional ratio of solvent and the salt concentration in the electrolyte) and volume of liquid, etc., as a result of which battery performance may fall below the desired level.

This invention was arrived at in light of these circumstances. The primary objects of the invention are to provide a method of manufacturing a nonaqueous electrolyte secondary batteries in which the nonaqueous electrolyte composition and liquid volume are kept from changing following injection of the nonaqueous electrolyte and the initial internal pressure within the battery case can be set in a reduced-pressure state, and to provide a nonaqueous electrolyte secondary battery obtained by such a method.

Accordingly, to resolve the above problems, this invention provides a method of manufacturing a nonaqueous electrolyte secondary battery which includes the following steps (i) to (iii). That is, the method of manufacturing a nonaqueous electrolyte secondary battery disclosed herein comprises:

(i) placing an electrode assembly that includes a positive electrode and a negative electrode in a hermetically sealable battery case;

(ii) setting the interior of the battery case in which the electrode assembly has been placed in a pressure-reduced state, and injecting a nonaqueous electrolyte into the pressure-reduced battery case; and (iii) following electrolyte injection, releasing the pressure-reduced state and sealing the battery case under atmospheric pressure conditions. In the manufacturing method disclosed herein, sealing of the battery case is carried out before a given amount of the injected electrolyte completely impregnates the interior of the electrode assembly, so that the remaining nonaqueous electrolyte impregnates the interior of the electrode assembly after sealing, thereby making the pressure of voids in the battery case (here and below, "voids" typically refers to spatial regions within the case, exclusive of the nonaqueous electrolyte and the electrode assembly) lower than atmospheric pressure (that is, placing the battery case in a pressure-reduced state).

The manufacturing method according to the above embodiment of the invention makes it possible to set the initial internal pressure within the battery case (which refers, here and below, to the gas pressure within the battery case before initial charging) in a pressure-reduced state, thereby enabling the manufacture of a nonaqueous electrolyte secondary battery in which unnecessary increases in the battery internal pressure caused by gas formation and/or volumetric expansion of residual gases, etc. during normal use and during initial charging are effectively reduced. Moreover, the manufacturing method according to this embodiment of the invention enables the voids within the sealed battery case to be set in a pressure-reduced state without carrying out vacuum treatment with the battery case in an opened state following injection of the nonaqueous electrolyte into the battery case, thus making it possible to prevent the nonaqueous electrolyte from vaporizing outside of the battery case on account of forced vacuum treatment with the battery case in an opened state. As a result, changes in the composition and liquid volume of the nonaqueous electrolyte following electrolyte injection can be prevented, enabling associated decreases in the battery performance to be avoided. It is therefore possible, with the nonaqueous electrolyte secondary battery manufacturing method disclosed herein, to manufacture a nonaqueous electrolyte secondary battery having an initial internal pressure within the battery case that is sufficiently low and for which changes in the composition of the solvent making up the electrolyte are minimized.

Moreover, with the manufacturing method according to this embodiment of the invention, compared with conventional manufacturing methods in which the battery case is vacuum sealed following injection of the nonaqueous electrolyte into the battery case, forced vacuum treatment can be eliminated, enabling battery production costs to be reduced by an amount corresponding to the costs incurred in carrying out such forced vacuum treatment. Furthermore, in conventional vacuum sealing methods, when the void volume within the battery case at the time of vacuum sealing is small, it has been difficult to achieve a sufficient vacuum effect. However, with the nonaqueous electrolyte secondary battery manufacturing method disclosed herein, no influence is incurred due to the void volume within the battery case during sealing of the battery case, enabling a sufficient vacuum effect to be achieved.

In this specification, "nonaqueous electrolyte secondary battery" refers to a battery provided with a nonaqueous electrolyte (typically an electrolyte solution containing a supporting salt in an organic solvent) that exhibits a liquid state at normal temperatures (e.g., 25 deg C.). Also, in this specification, "lithium ion secondary battery" refers to a secondary battery that uses lithium ions as the charge carrier and in which charging and discharging are effected by the movement of lithium ions between the positive and negative electrodes.

In a preferred embodiment of the method of manufacturing a nonaqueous electrolyte secondary batteries disclosed herein, sealing of the battery case is carried out at a timing such that the pressure (gas pressure) of the voids in the battery case after sealing achieves a level not more than 90% of atmospheric pressure.

The manufacturing method according to this embodiment of the invention enables the initial internal pressure within the battery case to be adequately lowered, thus making it possible to effectively reduce an excessive rise in the battery internal pressure owing to gas formation and/or volumetric expansion of residual gases, etc. during normal use and at the time of initial charging. This enables the manufacturing of nonaqueous electrolyte secondary batteries in which CID and gas release valve malfunctions are minimized and which have excellent battery performance.

In a preferred embodiment of the method of manufacturing a nonaqueous electrolyte secondary batteries disclosed herein, sealing of the battery case is carried out at a timing such that at least 10 vol % of the electrolyte injected into the battery case impregnates the interior of the electrode assembly following sealing of the battery case.

With the manufacturing method according to this embodiment of the invention, a sufficient amount of nonaqueous electrolyte impregnates the interior of the electrode assembly after the battery case has been placed in a hermetically sealed state, thus enabling the initial internal pressure within the battery case to be effectively lowered. In particular, during the manufacture of secondary batteries in which the rate of impregnation by the nonaqueous electrolyte into the electrode assembly is slow, such as nonaqueous electrolyte secondary batteries having a high-density electrode active material layer (electrode mixture layer), high-volume nonaqueous electrolyte secondary batteries and high-liquid-volume nonaqueous electrolyte batteries, a high initial internal pressure-lowering effect can be achieved.

In a preferred embodiment of the method of manufacturing a nonaqueous electrolyte secondary batteries disclosed herein, a graphite material is used as the negative electrode active material.

This makes it possible, even in cases where lithium ion secondary batteries that use a natural graphite-based active material as the negative electrode active material are manufactured, to suppress an excessive rise in battery internal pressure caused by gases that form during initial charging of the lithium ion battery, and effectively reduce the residual presence of such gases within the electrode assembly (e.g., at the interior of the porous battery members and between the electrode plates), etc.

In a preferred embodiment of the method of manufacturing a nonaqueous electrolyte secondary batteries disclosed herein, after sealing of the battery case, at least one charging treatment is carried out in a state where the pressure (gas pressure) of the voids in the battery case is lower than atmospheric pressure.

In the manufacturing method according to this embodiment of the invention, even when gases have formed during charging, these gases do not remain within the electrode assembly (e.g., within the porous battery members and between the electrode plates) and are effectively discharged to a pressure-reduced space above the nonaqueous electrolyte within the battery case. It is thus possible to manufacture nonaqueous electrolyte secondary batteries in which rises in the internal resistance of the battery and hindering of the charge-discharge reactions have been effectively suppressed.

DESCRIPTION OF EMBODIMENTS

Preferred embodiments of the invention are described below while referring as appropriate to the diagrams. Note that technical matters which are required for carrying out the present invention but are not particularly mentioned in the present specification (such as general manufacturing processes for batteries that are not essential features of the invention) can be understood as design matters for the individual skilled in the art based on the conventional art in the pertinent field. The present invention can be practiced based on the technical details disclosed in the present specification and on common general technical knowledge in the pertinent field. In the following diagrams, members or sites having like functions are assigned with a common reference numeral, and repeated description may be omitted or simplified. Also, dimensional relationships (of length, width, thickness, etc.) in each diagrams do not necessary reflect actual dimensional relationships.

Although not intended particularly by way of limitation, the construction of nonaqueous electrolyte secondary batteries according to the invention is described in detail below while referring to the nonaqueous electrolyte secondary battery (lithium ion secondary battery) 100 shown in FIGS. 1 to 3.

Figure 1:
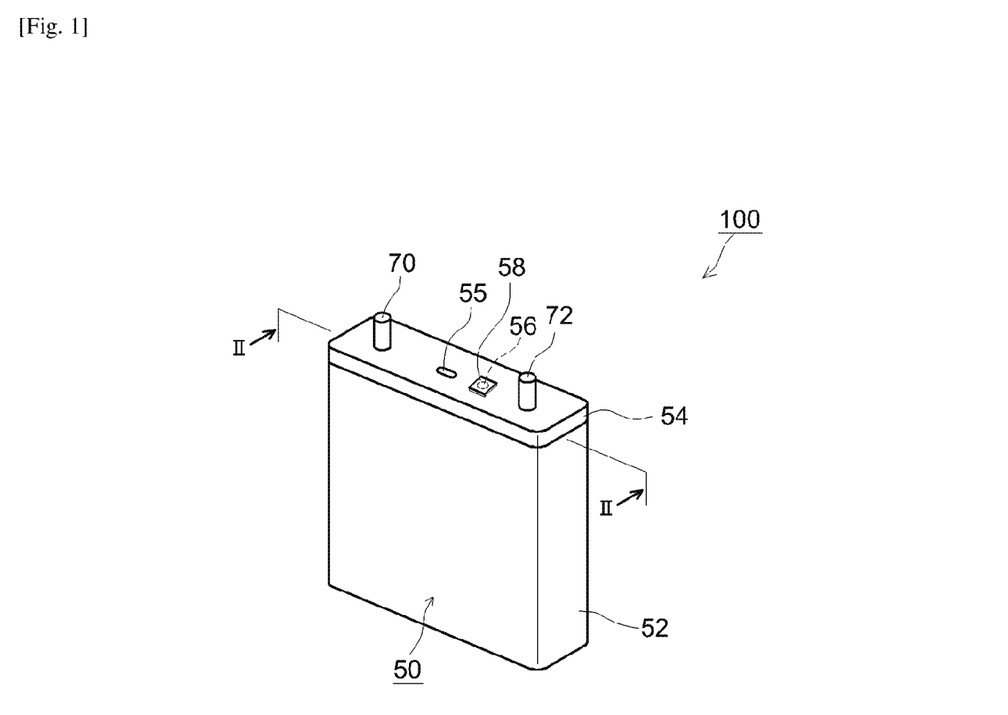
FIG. 1 is a perspective view schematically showing the external shape of a nonaqueous electrolyte secondary battery according to an embodiment of the invention.
Figure 2:
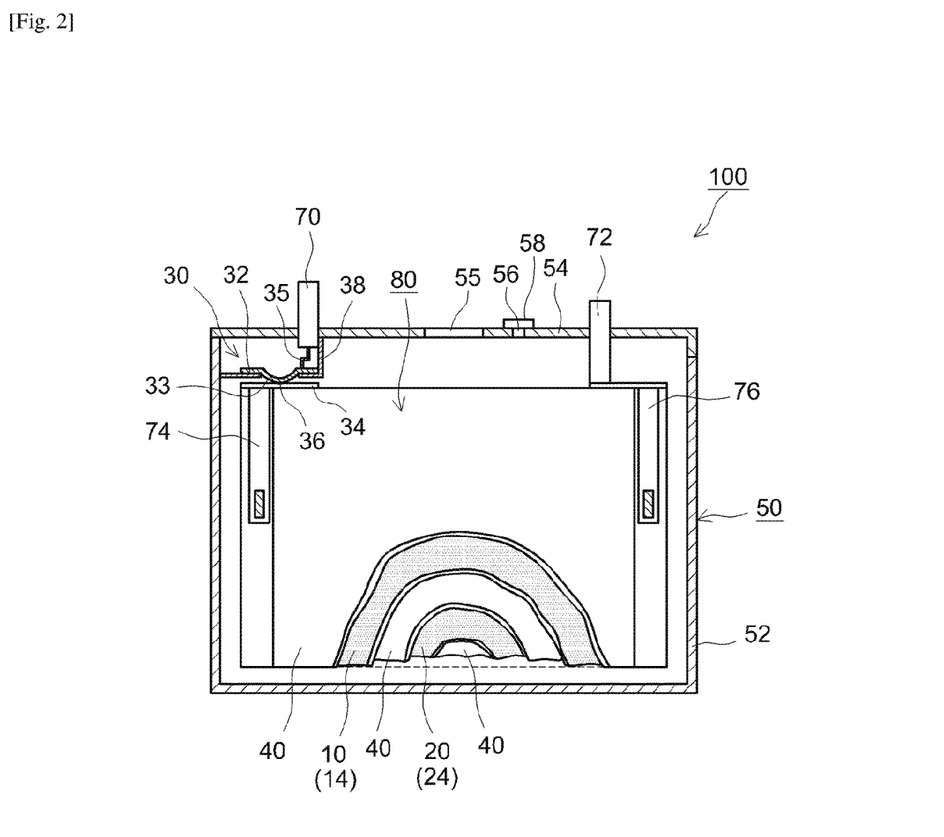
FIG. 2 is a longitudinal sectional view which is taken along line II-II in FIG. 1 and schematically shows the cross-sectional structure of the battery.

The lithium ion secondary battery 100 shown in FIGS. 1 and 2 is, in broad terms, a square battery 100 having a hermetically sealed structure that includes a flatly coiled electrode assembly (coiled electrode assembly) 80, a hermetically sealable battery case 50 of a flat cuboid (box-like) shape that houses the coiled electrode assembly 80 of flattened shape and a nonaqueous electrolyte (not shown), a lid 54 which seals an opening in the case 50 (battery case body 52), and a positive electrode terminal 70 and negative electrode terminal 72 which are electrically connected to the coiled electrode assembly 80. The lid 54 is provided with a safety valve 55 for discharging, to the exterior of the battery case 50, gases that have formed at the interior of the battery case 50. In addition, an injection hole 56 for injecting the nonaqueous electrolyte into the battery case 50 in which the electrode assembly 80 has been housed is formed in the lid 54, and this injection hole 56 is sealed with a sealing plug 58 following injection of the nonaqueous electrolyte.

Figure 3:
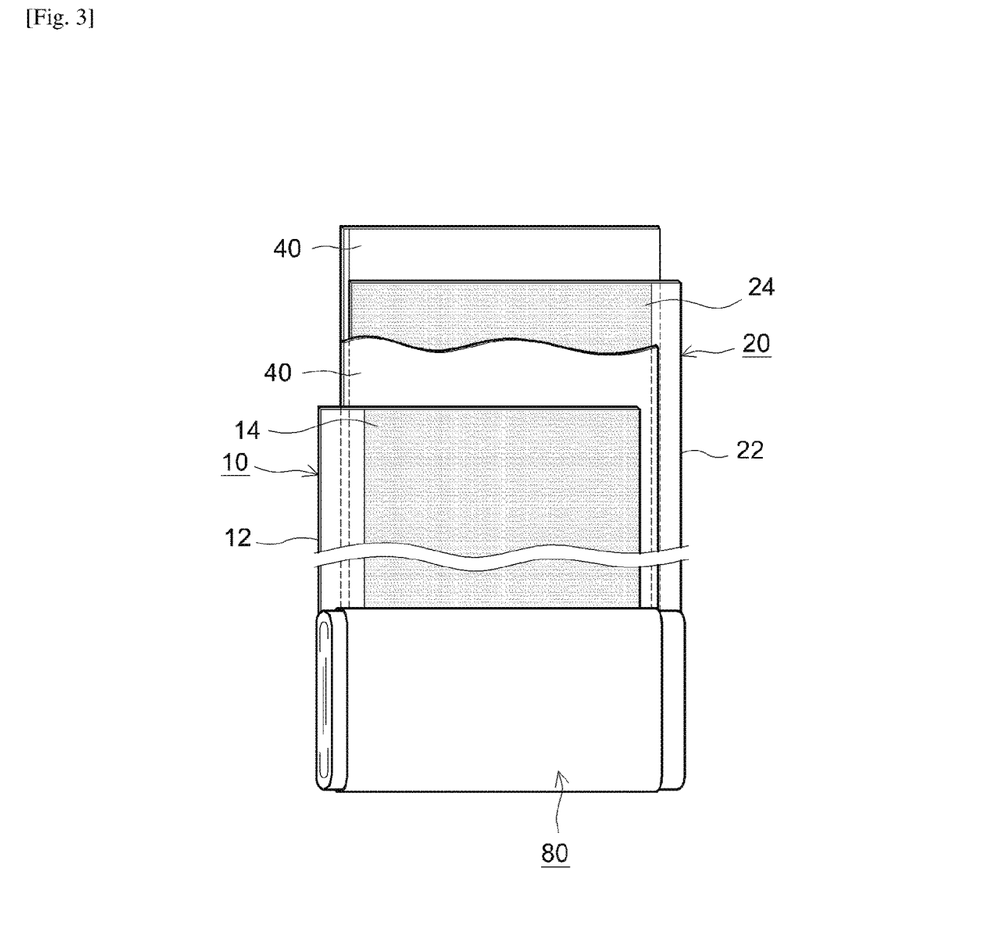
FIG. 3 is a schematic diagram showing the structure of a coiled electrode assembly according to an embodiment of the invention.

As shown in FIGS. 2 and 3, the coiled electrode assembly 80 having a flattened shape is housed at the interior of the battery case 50. This coiled electrode assembly 80 has been formed by stacking together a positive electrode 10, a negative electrode 20 and a separator 40, each of which is shaped as an elongated sheet, in the lengthwise direction of the sheets and coiling them together in the stacked state.

As shown in the diagrams, a positive electrode mixture layer 14 and a negative electrode mixture layer 24 are formed in the lengthwise direction on one or both sides (in this case, on both sides) of, respectively, a positive electrode current collector 12 and a negative electrode current collector 22. The positive electrode in this coiled electrode assembly 80 is sometimes referred to below as the positive electrode sheet 10, and the negative electrode is sometimes referred to as the negative electrode sheet 20.

As shown in FIG. 3, during the stacking process, the positive electrode sheet 10 and the negative electrode sheet 20 are arranged over one another at a mutual offset in the width direction, in such a way that part of a positive electrode mixture layer-uncoated region on the positive electrode sheet 10 (that is, a region where the positive electrode mixture layer 14 has not been formed, leaving the positive electrode current collector 12 exposed) protrudes beyond one edge (on the left side in the diagram) of the coiled electrode assembly 80, and part of a negative electrode mixture layer-uncoated region on the negative electrode sheet 20 (that is, a region where the negative electrode mixture layer 24 has not been formed, leaving the negative electrode current collector 22 exposed) protrudes beyond the other edge (on the right side in the diagram). As a result, a stacked portion where the positive electrode sheet 10, the negative electrode sheet 20 and the separator sheet 40 have been stacked and coiled is formed at the center of the coiled electrode assembly 80, and a positive electrode mixture layer-uncoated protruding region and a negative electrode mixture layer-uncoated protruding region where parts of these positive and negative electrode mixture layer-uncoated regions respectively protrude beyond the stacked portion are formed on both edges of the coiled electrode assembly 80 in the coiling axis direction thereof. Moreover, as shown in FIG. 2, a positive electrode current collecting plate 74 and a negative electrode current collecting plate 76 are joined by ultrasonic welding, resistance welding or the like to, respectively, the positive electrode mixture layer-uncoated protruding region and the negative electrode mixture layer-uncoated protruding region. Moreover, as shown in the diagrams, the positive electrode current collecting plate 74 and the negative electrode current collecting plate 76 are electrically connected to, respectively, the positive electrode terminal 70 and the negative electrode terminal 72.

As shown in FIG. 2, a current interrupt device (CID) 30 that actuates with a rise in internal pressure within the battery case 50 is provided at the interior of the battery case 50. Various hitherto known mechanisms may be employed as the current interrupt device 30, so long as it is constructed in such a way as to interrupt the conductive path from at least one electrode terminal (here, the positive electrode terminal 70) to the electrode assembly 80 when the internal pressure of the battery case 50 has risen. In this embodiment, the current interrupt device 30 is provided between the positive electrode terminal 70 attached to the lid 54 and the electrode assembly 80.

Specifically, this current interrupt device 30 has an insulating case 38 made of plastic or the like and also has a deformable metal plate 32 and a connecting metal plate 34 which are electrically connected to each other at a junction point 36. The insulating case 38 is provided so as to enclose the deformable metal plate 32, and the top side of the deformable metal plate 32 is airtightly sealed. The interior pressure of the battery case 80 does not act on the top side of this airtightly sealed deformable metal plate 32. The deformable metal plate 32 has at the center thereof a curved portion 33 which curves downwardly in the battery case 50, and has a portion peripheral thereto which is connected through a current-collecting lead terminal 35 to the bottom side of the positive electrode terminal 70. A positive electrode current-collecting plate 74 is connected to the bottom side (backside) of the connecting metal plate 34.

In cases where the internal pressure of the battery case 50 rises higher than a set pressure, the downwardly curved portion 33 of the deformable metal plate 32 deforms in such a way as to be pushed upward (vertically inverted), breaking the junction point 36 between the deformable metal plate 32 and the connecting metal plate 34 and parting from the connecting metal plate 34, thereby also cutting the conductive path. Of course, in the practice of this invention, the structure of the current interrupt device (CID) is not limited to the foregoing embodiment.

Next, simple explanations of each of the components in the lithium ion secondary battery 100 according to this embodiment are given below, although the invention is not limited to the structures and compositions of these components.

First, the materials making up the electrodes are described. As the positive electrode current collector 12 in the positive electrode sheet 10 according to this embodiment, an electrically conductive member made of a metal such as aluminum, nickel, titanium, stainless steel or an alloy composed mainly of these can be preferable used. As the positive electrode active material included in the positive electrode mixture layer 14, one, two or more substances capable of being conventional used as the positive electrode active material in a lithium ion secondary battery can be used. For example, lithium composite metal oxides having layered structures, spinel structures or other (e.g., $LiNiO_2$, $LiCoO_2$, $LiFeO_2$, $LiMn_2O_4$, $LiNi_{0.5}Mn_{1.5}O_4$, $LiCrMnO_4$, $LiFePO_4$, etc.) can be preferred used. Electrically conductive materials that may be advantageously used include carbon materials such as carbon black (typically, acetylene black, ketjen black), activated carbon, graphite and carbon fibers. Binders that may be advantageously used include the following polymeric materials: vinyl halide resins such as polyvinylidene fluoride (PVDF), polyalkylene oxides such as polyethylene oxide (PEO) and so on. In addition to the above materials, various types of additives (e.g., inorganic compounds that form gases when overcharging occurs, dispersants, thickeners, etc.) may be used.

Such a positive electrode sheet 10 can be formed by dispersing a positive electrode active material of suitable particle sizes, conductive material and binder in a suitable solvent (e.g., N-methyl-2-pyrrolidone) to prepare a paste-like (slurry-like) composition, then applying a suitable amount of this composition onto the surface of a positive electrode current collector 12 and subsequently removing the solvent by drying. If necessary, the properties of the positive electrode mixture layer 14 can be adjusted by performing suitable pressing treatment.

The average thickness per one side of the positive electrode mixture layer 14 may be set to, for example, at least 40 micrometer (typically, at least 50 micrometer), and not more than 100 micrometer (typically, not more than 80 micrometer). The average density of the positive electrode mixture layer 14 may be set to, for example, from 1 $g/cm^3$ to 4 $g/cm^3$ (e.g., from 1.5 $g/cm^3$ to 3.5 $g/cm^3$). The porosity of the positive electrode mixture layer 14 may be set to, for example, from 10 vol % to 50 vol % (typically, from 20 vol % to 40 vol %). In this specification, "porosity" refers to the value obtained by dividing the total pore volume ($cm^3$), as measured with a mercury porosimeter, by the apparent volume ($cm^3$) of the mixture layer, then multiplying by 100. The apparent volume can be calculated from the product of the surface area ($cm^2$) in a plan view and the thickness (cm). A positive electrode mixture layer 14 having such properties is able to maintain suitable voids at the interior thereof, enabling the nonaqueous electrolyte to sufficiently infiltrate therein. Hence, a broad locus of reaction with charge carriers can be ensured, enabling higher input/output properties to be achieved. Also, the electrical conductivity within the positive electrode mixture layer 14 can be properly maintained and increases in resistance can be suppressed. Moreover, the mechanical strength (shape retention properties) of the positive electrode mixture layer can be ensured, enabling better cycle performance to be achieved.

As the negative electrode current collector 22 in the negative electrode sheet 20 according to this embodiment, an electrically conductive member made of a metal such as nickel, titanium or stainless steel or an alloy composed mainly of these can be preferable used. As the negative electrode active material included in the negative electrode mixture layer 24, one, two or more substances capable of being conventional used as the negative electrode active material in lithium ion secondary batteries can be used. To obtain an excellent electrical conductivity and a high energy density, a graphite material such as natural graphite or synthetic graphite (and especially natural graphite) is preferred. For example, carbon materials such as graphite, non-graphitizable carbon (hard carbon), graphitizable carbon (soft carbon) and carbon nanotubes can be preferred used. Binders that may be preferred used include polymeric materials such as styrene-butadiene rubber (SBR), polyvinylidene fluoride (PVDF) and polytetrafluoroethylene (PTFE). In addition to the above materials, various types of additives (e.g., thickeners, dispersants, conductive materials, etc.) may be used. For example, carboxymethylcellulose (CMC) and methyl cellulose (MC) may be used as thickeners.

Such a negative electrode sheet 20 may, for example, be formed in much the same way as the above-described positive electrode sheet 10. That is, it can be formed by dispersing a negative electrode active material of suitable particle sizes and a binder in a suitable solvent to prepare a paste-like (slurry-like) composition, then applying a suitable amount of this composition onto the surface of a negative electrode current collector 22 and subsequently removing the solvent by drying. If necessary, the properties of the negative electrode mixture layer 24 can be adjusted by performing a suitable pressing treatment.

The average thickness per one side of the negative electrode mixture layer 24 may be set to, for example, at least 40 micrometer (typically, at least 50 micrometer), and not more than 100 micrometer (typically, not more than 80 micrometer). The average density of the negative electrode mixture layer 24 may be set to, for example, from 0.5 $g/cm^3$ to 2 $g/cm^3$ (e.g., from 1 $g/cm^3$ to 1.5 $g/cm^3$). The porosity of the negative electrode mixture layer 24 may be set to, for example, from 5 vol % to 50 vol % (typically, from 35 vol % to 50 vol %). A negative electrode mixture layer 24 having such properties is able to maintain suitable voids at the interior thereof, enabling the nonaqueous electrolyte to sufficiently infiltrate therein. Hence, a broad locus of reaction with charge carriers can be ensured, enabling higher input/output properties to be achieved. Moreover, the interface with the nonaqueous electrolyte can be suitably maintained, enabling a higher durability (e.g., better cycle performance) to be achieved.

The separator (separator sheet) 40 according to this embodiment is not particularly limited, and may be the same as that provided in conventional lithium ion secondary batteries, so long as it insulates between the positive electrode mixture layer 14 and the negative electrode mixture layer 24 and also has a nonaqueous electrolyte retaining ability and a shutdown function. Suitable examples include porous sheets (films) made of resin such as polyethylene (PE), polypropylene (PP), polyester, cellulose and, polyamide. Such porous sheets may have a single-layer structure or a stacked structure of two or more layers (e.g., a three-layer structure in which PP layers have been arranged on both sides of a PE layer).

The nonaqueous electrolyte is typically a solution of at least a supporting salt in an organic solvent (nonaqueous solvent). The nonaqueous electrolyte exhibits a liquid state at normal temperature (e.g., 25 deg C.). In a preferred embodiment, it always exhibits a liquid state in the service environment of the battery (e.g., in a temperature environment of from −30 deg C. to 60 deg C.). The organic solvent is not particularly limited; one, two or more of various organic solvents known to be capable of use in the electrolyte solution of ordinary lithium ion secondary batteries may be used. Examples include carbonates, ethers, esters, nitriles, sulfones, lactones and so on. Preferred examples include ethylene carbonate (EC), propylene carbonate (PC), diethyl carbonate (DEC), dimethyl carbonate (DMC), ethyl methyl carbonate (EMC) and so on.

The supporting salt is not particularly limited, provided it includes charge carriers (typically, lithium ions); one, two or more of the same types as used in ordinary lithium ion secondary batteries may be used. Illustrative examples include lithium salts such as $LiPF_6$, $LiBF_4$, $LiClO_4$, $LiAsF_6$, $Li(CF_3SO_2)_2N$ and $LiCF_3SO_3$. $LiPF_6$ is especially preferred as the supporting salt. It is desirable to prepare the nonaqueous electrolyte so that the concentration of the above supporting salt falls in the range of 0.7 mol/L to 1.3 mol/L.

In a preferred embodiment, the nonaqueous electrolyte includes a gas-forming agent which decomposes when a given battery voltage is exceeded and is able to form a gas. The gas-forming agent is not particularly limited, so long as it is a compound which decomposes when a given battery voltage is exceeded and is able to form a gas (that is, a compound which has an oxidation potential (vs. $Li/Li^+$) equal to or higher than the positive electrode charging upper limit potential (vs $Li/Li^+$), and which decomposes and is able to form a gas when the battery exceeds this potential and reaches an overcharged state). Illustrative examples include organophosphorus compounds, carbonate compounds, cyclic carbamate compounds, alicyclic hydrocarbons and aromatic compounds such as biphenyl compounds, alkylbiphenyl compounds, cycloalkylbenzene compounds, alkylbenzene compounds and fluorine atom-substituted aromatic compounds, etc.

With regard to the inventive method of manufacturing a nonaqueous electrolyte secondary batteries, a preferred embodiment for the manufacture of lithium ion secondary batteries 100 of the above construction is described below while making suitable reference to the diagrams. However, the inventive method of manufacturing a nonaqueous electrolyte secondary batteries is not intended to be limited to the following embodiment.

Figure 4:
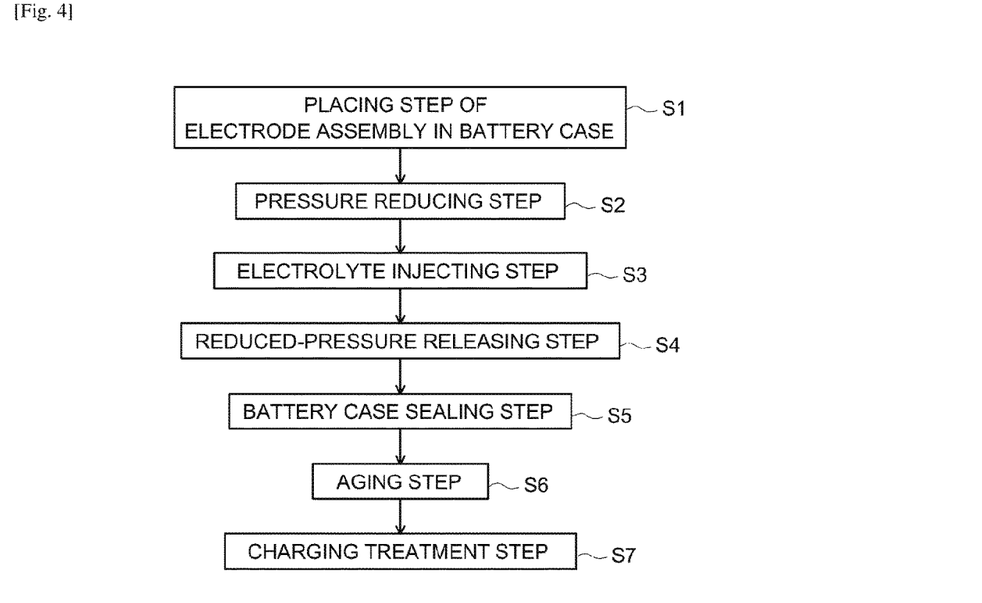
FIG. 4 is a flow chart illustrating the method of manufacturing a nonaqueous electrolyte secondary batteries according to an embodiment of the invention.

As shown in FIG. 4, the method of manufacturing a nonaqueous electrolyte secondary battery 100 disclosed herein generally includes a step in which an electrolyte assembly is placed in a battery case (S1), a pressure reducing step (S2) in which the pressure within the battery case is reduced, an electrolyte injecting step (S3) in which electrolyte is injected into the pressure-reduced battery case, a reduced-pressure releasing step (S4) in which the reduced-pressure state within the case is released following electrolyte injection, a sealing step (S5) in which the battery case is sealed under atmospheric pressure conditions, an aging step (S6) following sealing, and a charging treatment step (S7) in which initial charging after aging is carried out. The sequence of above steps (S1) to (S6) may also be regarded as a battery assembly manufacturing method. The above pressure reducing step (S2) and electrolyte injecting step (S3) may be carried out at the same time. The manufacturing method according to this embodiment is described in greater detail below.

First, the step of placing the electrode assembly in the battery case (S1) is described. The means for placing the coiled electrode assembly 80 in the battery case 50 is not particularly limited, although typically, as shown in FIG. 2, the coiled electrode assembly 80 is placed inside the battery case body 52 with the coiling axis of the coiled electrode assembly 80 oriented horizontally (i.e., in an attitude where the opening in the battery case body 52 is formed in a direction normal to the coiling axis). At this time, the positive and negative electrode current-collecting plates 74, 76 joined to the electrode assembly 80 are respectively connected by resistance welding or the like to the external positive electrode terminal 70 (made of aluminum, for example) and the external negative electrode terminal 72 (made of nickel, for example) provided on the lid 54. After the electrode assembly 80 connected to the lid 54 has been placed within the battery case 50, the boundary region between the battery case body 52 and the lid 54 can be sealed by welding the lid 54 to the peripheral edge of the opening in the battery case body 52.

In this embodiment, following the above step (S1) of placing the electrode assembly in the battery case, only the nonaqueous electrolyte injection hole 56 provided in the lid 54 remains an open region communicating between the case interior and the case exterior. Using this open region (nonaqueous electrolyte injection hole 56), the pressure reducing step (S2), the electrolyte injecting step (S3), the reduced-pressure releasing step (S4) and the battery case sealing step (S5) are carried out.

Next, the pressure reducing step (S2) is described. In this embodiment, after the coiled electrode assembly 80 has been placed within the battery case 50, the interior of the battery case 50 is set in a reduced-pressure state (a lower-than-atmospheric-pressure state). The method of setting the interior of the battery case 50 in a reduced-pressure state is not particularly limited: use may be made of a hitherto known method, so long as it is a method capable of lowering the pressure to the desired level. Typically, the interior of the battery case 50 can be set in a reduced-pressure state by using a vacuum pump (pressure-reducing pump) to discharge gases within the battery case 50 from the nonaqueous electrolyte injection hole 56.

The degree of pressure reduction is not particularly limited, so long as it is possible to efficiently inject the nonaqueous electrolyte into the battery case 50 in a short time, although it is preferable to reduce the pressure to a gas pressure which is preferably 50% or less, and most preferably 80% or less, of atmospheric pressure (about 0.1 MPa). A larger difference between the pressure within the battery case 50 (gas pressure) and atmospheric pressure increases the nonaqueous electrolyte drawing force into the battery case 50 at the time of the subsequently described electrolyte injecting step (S3), enabling the injection time to be shortened. It is preferable to set the degree of pressure reduction from atmospheric pressure to a pressure-reducing level in the range of −70 kPa to −90 kPa. For example, pressure reduction which sets the gas pressure within the battery case 50 in the range of at least 5 kPa and not more than 20 kPa is preferred. However, a higher degree of vacuum (pressure reduction) is undesirable because excessive vaporization of the organic solvent within the injection nonaqueous electrolyte may arise.

Next, the electrolyte injecting step (S3) is described. Nonaqueous electrolyte is injected through the nonaqueous electrolyte injection hole 56 into the battery case 50 whose interior has been set in a pressure-reduced state, such injection being carried out while the reduced-pressure state is maintained. The nonaqueous electrolyte should be injected into the battery case 50 under reduced-pressure conditions; the pressure-reducing step (S2) and electrolyte injecting step (S3) may be carried out at the same time. The injection method is not particularly limited; a predetermined amount of nonaqueous electrolyte can be fed into the case 50 using an ordinary electrolyte injection device. That is, the feed nozzle (not shown) on an electrolyte injection device may be connected to the nonaqueous electrolyte injection hole 56, and a predetermined amount of nonaqueous electrolyte fed into the battery case 50 in a pressure-reduced state.

The amount of nonaqueous electrolyte injected into the battery case 50 may be set to an amount sufficient for complete impregnation of the interior of the electrode assembly 80 by the nonaqueous electrolyte. For example, if the amount of nonaqueous electrolyte that completely impregnates the interior of the electrode assembly 80 is X mL, then the amount of nonaqueous electrolyte injected into the battery case 50 should be at least X mL. Generally, a surplus amount of nonaqueous electrolyte is injected in addition to X mL of nonaqueous electrolyte. The total amount of nonaqueous electrolyte injected into the battery case (the sum of X mL and the above surplus amount) differs according to such factors as the construction and size of the electrode assembly and the capacity (volume) of the battery case, and thus is not subject to any particular limitation. For example, the amount of nonaqueous electrolyte injected into the battery case 50 is preferably from about 1.1 times to about 2 times, and more preferably from about 1.25 times to about 1.5 times, greater than X mL.

Next, the reduced-pressure releasing step (S4) is described. In this embodiment, the reduced-pressure state within the battery case 50 into which nonaqueous electrolyte has been injected as described above under reduced-pressure conditions is subsequently released, thereby setting the pressure of voids within the battery case 50 to atmospheric pressure. The method for releasing the reduced-pressure state within the battery case 50 is not particularly limited; any hitherto known method may be employed, provided it is a method capable of setting the pressure following release to atmospheric pressure. Voids in the battery case 50 are typically set to atmospheric pressure (normal pressure) by flushing the voids with an atmospheric-pressure inert gas (such as nitrogen gas or argon gas). Illustrative examples include injecting atmospheric-pressure inert gas through the nonaqueous electrolyte injection hole 56, or opening up the nonaqueous electrolyte injection hole 56 in an atmospheric-pressure inert gas atmosphere, etc.

Next, the battery case sealing step (S5) is described. After voids within the battery case 50 have been set to atmospheric pressure (normal pressure) in the above reduced-pressure releasing step (S4), the opening in the battery case 50 (typically, the nonaqueous electrolyte injection hole 56) is sealed (airtightly closed). Specifically, the nonaqueous electrolyte injection hole 56 formed in the lid 54 is closed with a sealing plug 58, thereby making the interior of the case 50 a sealed space. The shape and material of the sealing plug 58 are not particularly limited and may be the same as have been used ordinary lithium ion secondary batteries, so long as provided the sealing plug 58 is able to airtightly close the battery case 50. And, the method of closing the injection hole 56 is not particularly limited and may be the same as have been employed on hitherto known method, so long as it is a method capable of airtightly closing the battery case 50. Examples of suitable methods include that of disposing the sealing plug 58 at a position that blocks the injection hole 56 on the lid 54, and sealing the injection hole 56 by welding this injection plug 58 to the lid 54; and the method of sealing the injection hole 56 by swaging the sealing plug 58 to the injection hole 56.

As for the timing with which the battery case 50 is sealed, such sealing is carried out before a predetermined amount of the nonaqueous electrolyte injected in the electrolyte injecting step (S3) (the predetermined amount typically being the amount of nonaqueous electrolyte that completely impregnates the interior of the electrode assembly 80: X mL) completely impregnates the interior of the electrode assembly 80 (that is, before the electrode assembly 80 is completely impregnated). This can enable the effect that allows the remaining nonaqueous electrolyte to impregnate the interior of the electrode assembly 80 after sealing of the battery case 50, thereby enables the pressure of voids within the battery case 50 to be made lower than atmospheric pressure (which the effect is also referred to here as the "impregnation pressure-reducing effect") to be achieved. That is, the initial internal pressure within the battery case 50 can be set in a pressure-reduced state.

Although not particularly limited, it is generally suitable to carry out sealing at a timing such that the pressure within the battery case 50 after sealing achieves a level not more than 90% of atmospheric pressure (e.g., the gas pressure within the battery case 50 becomes 90 kPa or less). For example, sealing may be carried out at a timing such that the pressure within the battery case 50 after sealing achieves a level which is about 10 kPa to about 70 kPa lower than atmospheric pressure. It is desirable to carry out sealing at a timing such that the gas pressure within the battery case 50 after sealing becomes preferably not more than 80 kPa, and more preferably not more than 70 kPa. However, as the pressure of voids within the battery case 50 after sealing becomes lower, impregnation of the nonaqueous electrolyte into the electrode assembly 80 becomes more difficult. Therefore, to avoid insufficient impregnation of the nonaqueous electrolyte into the electrode assembly 80, and also from the standpoint of the efficiency of impregnation by the nonaqueous electrolyte into the electrode assembly 80, it is preferable for the battery case sealing step (S5) to be carried out at a timing which ensures a gas pressure within the case 50 after sealing of at least 20% of atmospheric pressure (e.g., 20 kPa or more, such as from 20 to 30 kPa).

So long as the degree of pressure reduction after sealing is not affected, although not particularly limited, it is suitable to carry out scaling at a timing such that at least 10 vol %, and preferably at least 20 vol % (e.g., from 10 to 50 vol %, such as from 20 to 40 vol %) of the total volume of nonaqueous electrolyte injected into the battery case 50 in the electrolyte injecting step (S3) is able to impregnate the interior of the electrode assembly 80 after sealing of the battery case. The larger the volume of nonaqueous electrolyte impregnating the interior of the electrode assembly 80 following sealing of the battery case, the higher the impregnation pressure-reducing effect can be achieved. For example, in secondary batteries having an battery case with an internal capacity of about 100 to 400 mL (typically, lithium ion secondary batteries for on-board use), scaling is preferably carried out at a timing such that the volume of nonaqueous electrolyte that has impregnated the interior of the electrode assembly after sealing (impregnated volume), i.e., the difference V2−V1 between the volume V2 (mL) of remaining voids within the case after the nonaqueous electrolyte has completely impregnated the interior of the electrode assembly and the volume V1 (mL) of remaining voids within the case when the case has been sealed, becomes about 25 to 75 mL.

The time from when the voids within the battery case 50 are returned to atmospheric pressure (normal pressure) in the reduced-pressure releasing step (S4) until the battery case sealing step (S5) is carried out (which time is also referred to here as the "atmospheric pressure holding time") is not particularly limited, provided the timing is such as to enable the above-described impregnation pressure-reducing effect to be achieved. The atmospheric pressure holding time may be set according to such factors as the construction of the electrode assembly 80, the volume and shape of the battery case 50, the amount and composition of the nonaqueous electrolyte injected in the electrolyte injection step (S3), and the impregnated state of the electrode assembly 80. The shorter the length of time in which voids within the battery case 50 open up to atmospheric pressure, the more easily the impregnation pressure-reducing effect can be achieved. Although not particularly limited, by way of illustration, it is preferable for the length of time in which voids within the battery case 50 open up to atmospheric pressure to be not more than 90 seconds (and more preferably not more than 60 seconds, such as about 30 to 60 seconds).

Before a predetermined amount (e.g. the amount of nonaqueous electrolyte that completely impregnates the interior of the electrode assembly 80: X mL) of the electrolyte injected in the electrolyte injecting step (S3) completely impregnates the interior of the electrode assembly 80, the electrode assembly 80 can be in a state of that regions not yet impregnated with the nonaqueous electrolyte (such as pores within porous electrode components and gaps between stacked electrode sheets that have not yet been impregnated with nonaqueous electrolyte) are present within the electrode assembly 80, and such not yet impregnated regions may be in a lower pressure state than atmospheric pressure (which the state of the electrode assembly 80 is also referred to below as "low-impregnation state"). In such the electrode assembly 80 in the low-impregnation-state, the nonaqueous electrolyte efficiently impregnates those regions within the electrode assembly 80 that have not yet been impregnated with nonaqueous electrolyte (nonaqueous electrolyte unimpregnated regions). Hence, the lower the impregnation state of the electrode assembly 80 when the battery case sealing step (S5) is carried out, the higher the impregnation pressure-reducing effect that can be achieved. For example, in nonaqueous electrolyte secondary batteries (especially lithium ion secondary batteries) having a relatively slow rate of impregnation by the nonaqueous electrolyte into the electrode assembly, such as nonaqueous electrolyte secondary batteries with a high-density electrode mixture layer, high-capacity nonaqueous electrolyte secondary batteries and high-fluid-volume nonaqueous electrolyte secondary batteries, because the above-described battery case sealing step is easy to carry out at a timing such that the interior of the coiled electrode assembly 80 is in a low-impregnation state, target batteries suitable for practicing the invention can be obtained.

From the standpoint of preventing changes in the composition of the nonaqueous electrolyte and obtaining a good manufacturing efficiency, etc., for example, it is preferable for the electrolyte injection step (S3), the reduced-pressure releasing step (S4) and the battery case sealing step (S5) to each be carried out in a normal temperature range (typically, in a temperature range of at least 5 deg C. and not above 35 deg C.).

Next, the aging step (S6) is described. In the practice of this invention, the nonaqueous electrolyte is made to impregnate the not yet impregnated regions of the electrode assembly 80 by allowing the nonaqueous electrolyte secondary battery 100 that was sealed in the above battery case sealing step (S5) to stand for a given period of time.

Here, the length of time for which the sealed battery 100 is left to stand is not particularly limited, provided it is at least a period of time sufficient for the above impregnation pressure-reducing effect to be elicited. For example, the battery 100 may be left to stand longer than the time it takes for the gas pressure within the battery case 50 to reach a state where further reduction does not occur (steady state). It is preferable to let the battery 100 stands for at least the length of time required for the electrode assembly 80 to reach a completely impregnated state. Although not particularly limited, aging may be carried out for at least 6 hours, and is preferably carried out for a period of at least 12 hours and up to several days (e.g., from 12 to 72 hours, and especially from 24 to 48 hours). The length of time for which the sealed nonaqueous electrolyte secondary battery 100 is left to stand may be suitably set according to such considerations as the construction of the electrode assembly 80, the volume and shape of the battery case 50, the amount and composition of the nonaqueous electrolyte injected in the electrolyte injecting step (S3), the timing at which the battery case sealing step (S5) is carried out and the state of impregnation of the electrode assembly 80 at such timing.

To prevent unnecessary increases in the battery internal pressure that are caused by the volume of gases remaining in the battery case 50 to expand and/or the vapor pressure of the electrolyte to rise, and also to prevent deterioration of the nonaqueous electrolyte secondary battery, it is suitable for the temperature at which the aging step (S6) is carried out to be in a normal temperature range (typically a temperature range of 5 deg C. to 35 deg C.), with a temperature range of about 15 deg C. to 25 deg C. being preferred.

Next, the charging treatment step (S7) is described. As mentioned above, after sealing the battery case 50, charging treatment is carried out at least once in a pressure-reduced state with the gas pressure within the battery case 50 lower than atmospheric pressure. The charging method is not particularly limited, and may be the same as the method employed in the manufacture of conventional nonaqueous electrolyte secondary batteries. For example, this may be advantageously carried out by constant current-constant voltage charging (CC-CV charging) in which constant-current charging at about 0.1C to 10C until the voltage between the positive and negative electrode terminals reaches a predetermined value (CC charging), followed by constant-voltage charging until the state-of-charge (SOC) reaches about 60% to 100% (CV charging). Charging treatment may be carried out a single time, or may be repeatedly carried two or more times interspersed with discharging treatment.

Examples relating to this invention are described below, although this should not be taken to imply that this invention is limited to that which is shown in these examples.

EXAMPLE 1

A lithium ion secondary battery (nonaqueous electrolyte secondary battery) according to Example 1 was fabricated employing the following materials and process.

A positive electrode mixture layer-forming slurry was prepared by charging a kneading machine with $LiNi_{0.38}Co_{0.32}Mn_{0.30}O_2$ (LNCM) as the positive electrode active material powder, acetylene black (AB) as the conductive material and polyvinylidene fluoride (PVDF) as the hinder in a weight ratio therebetween of LNCM:AB: PVDF=90:5:5, and kneading while adjusting the viscosity with N-methylpyrrolidone (NMP). This slurry was applied to both sides of an elongated aluminum foil having a thickness of 15 micrometer (positive electrode current collector), then dried and subsequently pressed, thereby producing a positive electrode sheet (total thickness, 130 micrometer; mixture layer density, 2.6 g/cm$^3$) comprising positive electrode mixture layers on a positive electrode current collector.

In a separate procedure, a negative electrode mixture layer-forming slurry was prepared by charging a kneading machine with natural graphite (C) as the negative electrode active material, styrene-butadiene rubber (SBR) as the binder, and carboxymethylcellulose (CMC) as the dispersant in a weight ratio therebetween of C:SBR:CMC=98:1:1, and kneading while adjusting the viscosity with ion-exchanged water. This slurry was applied to both sides of an elongated copper foil having a thickness of 10 micrometer (negative electrode current collector), then dried and subsequently pressed, thereby producing a negative electrode sheet (total thickness, 130 micrometer; mixture layer density, 1.4 g/cm$^3$) comprising negative electrode mixture layers on a negative electrode current collector.

Next, the positive electrode sheet and negative electrode sheet produced above were coiled together with two sheets of separator sheet (here, separator sheets having a three-layer structure consisting of layers of polypropylene (PP) stacked on both sides of a layer of polyethylene (PE) and a total thickness of 20 micrometer were used) and formed into a flattened shape, thereby producing a coiled electrode assembly like that shown in FIGS. 2 and 3.

The nonaqueous electrolyte was prepared by dissolving LiPF$_6$ as the supporting salt to a concentration of 1.0 mol/L in a mixed solvent containing ethylene carbonate (EC), dimethyl carbonate (DMC) and ethyl methyl carbonate (EMC) in a volumetric ratio of EC:DMC:EMC=30:30:40.

Next, a positive electrode terminal and a negative electrode terminal were attached to the lid of a square battery case having an internal capacity of 330 mL, and these terminals were electrically connected to, respectively, the positive electrode current collector and the negative electrode current collector (that is, the edges of the coiled electrode assembly (the regions where mixture layers have not been formed)) (see FIG. 2). A CID like that shown in FIG. 2 is provided on the positive electrode terminal side. The coiled electrode assembly that has thus been electrically connected to the lid was placed at the interior of the battery case body through the opening in the battery case body, and the opening was closed by welding together the peripheral edge of the opening in the battery case body and the lid. At this time, a nonaqueous electrolyte injection hole (see FIG. 1) is provided as the unique opening in the lid of the battery case.

Next, air within the battery case in which the coiled electrode assembly has been placed was evacuated through the nonaqueous electrolyte injection hole with a vacuum pump, thereby reducing the gas pressure within the battery case to 10 kPa or below. Next, with the pressure within the battery case held in this pressure-reduced state, about 130 mL of the nonaqueous electrolyte prepared as described above was injected through the electrolyte injection hole provided in the battery case lid. The gas pressure (A) within the battery case at this time (i.e., at the time of electrolyte injection) was 10 kPa. The step of injecting nonaqueous electrolyte into the battery case took about 60 seconds.

Following electrolyte injection, the nonaqueous electrolyte injection hole was opened under an inert gas atmosphere at atmospheric pressure, and the pressure of voids within the battery case was gradually returned to atmospheric pressure. The voids within the battery case following release of the reduced-pressure state within the battery case were exposed to atmospheric pressure for 60 seconds. The gas pressure (B) within the battery case at this time (i.e., at the time of release of the reduced pressure following electrolyte injection) was about 100 kPa.

Next, the nonaqueous electrolyte injection hole was sealed (hermetically closed) with a sealing plug under atmospheric pressure conditions. The battery was then left to stand in the sealed state for 24 hours, thereby causing the nonaqueous electrolyte to completely impregnate the interior of the electrode assembly. The amount of nonaqueous electrolyte (X mL) that completely impregnated the interior of the electrode assembly was about 80 mL. The gas pressure (C) within the battery case at this time (i.e., at the time of complete impregnation of the electrode assembly) was measured, whereupon the pressure was found to have decreased to about 70 kPa.

EXAMPLE 2

Employing the same materials and process as in Example 1, the procedure up until measurement of the gas pressure (B) within the battery case at the time of release of the reduced pressure following electrolyte injection was carried out, after which voids within the battery case were exposed for 60 seconds to atmospheric pressure conditions. This battery case was left to stand, with the nonaqueous electrolyte injection hole opened, for 24 hours under atmospheric pressure conditions, thereby allowing about 80 mL of nonaqueous electrolyte to completely impregnate the interior of the electrode assembly. Next, with the pressure within the battery case at atmospheric pressure, the nonaqueous electrolyte injection hole was closed (sealed) with a sealing plug, thus completing the fabrication of a battery according to Example 2. The gas pressure (C) within the battery case at this time (i.e., at the time of complete impregnation of the electrode assembly) was about 100 kPa.

EXAMPLE 3

Employing the same materials and process as in Example 1, the procedure up until measurement of the gas pressure (B) within the battery case at the time of release of the reduced pressure following electrolyte injection was carried out, after which voids within the battery case were exposed for 60 seconds to atmospheric pressure conditions. This battery case was left to stand, with the nonaqueous electrolyte injection hole opened, for 24 hours under atmospheric pressure conditions, thereby allowing about 80 mL of nonaqueous electrolyte to completely impregnate the interior of the electrode assembly. Next, using a vacuum pump, the gas pressure within the battery case was set in a reduced-pressure state of 80 kPa or below, and the nonaqueous electrolyte injection hole was sealed (hermetically closed) with a sealing plug under the reduced-pressure state, thus completing the fabrication of a battery according to Example 3. The gas pressure (C) within the battery case at this time (i.e., at the time of complete impregnation of the electrode assembly) was about 80 kPa.

Initial charging treatment was carried out on the batteries thus fabricated in Example 1 to Example 3. Specifically, CC-CV charging was carried out at a charging rate of 1C until the voltage between the positive and negative electrode terminals reached 4.1 V. The gas pressure (D) within each battery case following the completion of initial charging was then measured. The results are shown in FIG. 5.

Figure 5:
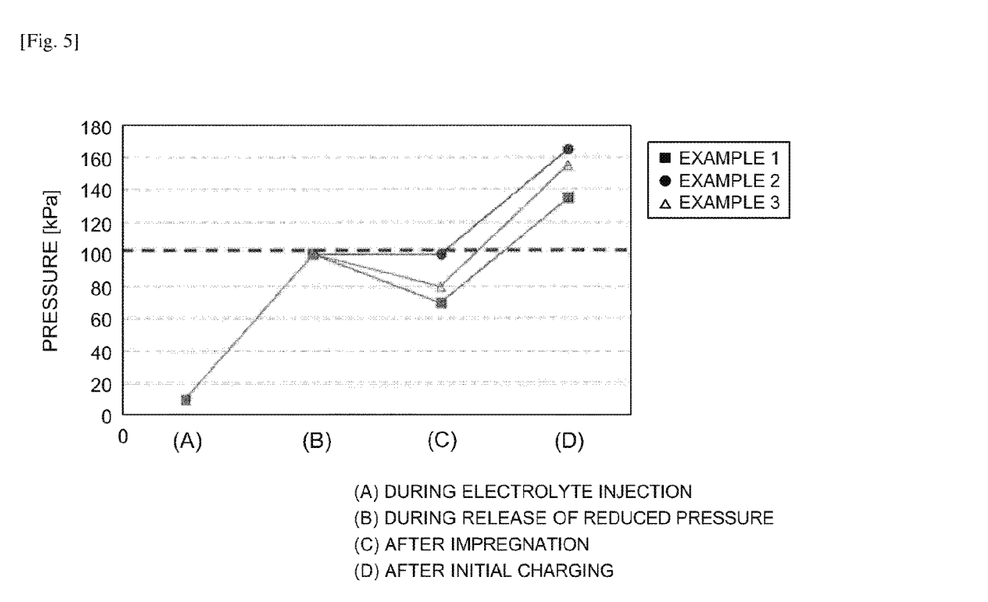
FIG. 5 is a graph showing pressure changes within the battery case during the manufacture of nonaqueous electrolyte secondary batteries in the working examples of the invention.

As is apparent from FIG. 5, it was confirmed that the battery according to Example 1, compared with the batteries according to Examples 2 and 3, had a lower gas pressure within the battery case (C) at the time of complete impregnation of the electrode assembly and (D) after initial charging. Moreover, in the battery of Example 3, the composition of the nonaqueous electrolyte differed before and after the electrolyte injection hole was sealed with a sealing plug. The reason is thought to be that, by carrying out pressure-reducing treatment with the battery case in an opened state following nonaqueous electrolyte injection, solvent within the electrolyte vaporized outside of the battery case. Such a change in the composition of the nonaqueous electrolyte was not observed in the battery according to Example 1.

These results demonstrate that, employing the method of manufacturing a nonaqueous electrolyte secondary batteries disclosed herein, nonaqueous electrolyte secondary batteries in which the initial internal pressure is low and the decrease in battery performances due to gases that form during initial charging and normal use is satisfactorily suppressed can be manufactured without changing the solvent composition of the nonaqueous electrolyte in the battery.

The invention has been described in detail above, although it should be noted that these embodiments and examples are provided only by way of illustration, many variations and modifications to these embodiments and examples being encompassed by the invention disclosed herein.

INDUSTRIAL APPLICABILITY

With the method of manufacturing a nonaqueous electrolyte secondary batteries disclosed herein, as explained above, pressure reduction can be effected within the battery case before initial charging while suppressing the vaporization amount of organic solvent and preventing a change in the composition of the nonaqueous electrolyte. As a result, current interrupt device and gas discharge valve malfunction due to gas that has formed at the time of initial charge or during normal use is prevented, enabling highly reliable, high-quality nonaqueous electrolyte secondary batteries (e.g., lithium ion secondary batteries) to be provided. The batteries can thus be advantageously used as, for example, an on-board power supply for driving a vehicle. Such batteries are especially suitable as a power source for driving plug-in hybrid vehicles (PHV), hybrid vehicles (HV) and electric vehicles (EV), etc. This invention also provides vehicles which are equipped with, as a power source (typically a assembled battery comprising a plurality of secondary batteries that are electrically connected to each other), nonaqueous electrolyte secondary batteries produced by the method of manufacturing a nonaqueous electrolyte secondary batteries disclosed herein.

The invention claimed is:

1. A method of manufacturing a nonaqueous electrolyte secondary battery, the method comprising:

placing an electrode assembly that includes a positive electrode and a negative electrode in a hermetically sealable battery case;

setting the interior of the battery case in which the electrode assembly has been placed in a pressure-reduced state, and injecting a nonaqueous electrolyte into the pressure-reduced battery case; and following electrolyte injection, releasing the pressure-reduced state and sealing the battery case under atmospheric pressure conditions, wherein sealing of the battery case is carried out in not more than 90 seconds from when voids within the battery case are exposed to atmospheric pressure during the releasing the pressure-reduced state, and the sealing of the battery case is carried out before a given amount of the injected electrolyte completely impregnates the interior of the electrode assembly, and at a timing such that at least 10 vol % of the nonaqueous electrolyte injected into the battery case impregnates the interior of the electrode assembly after sealing of the battery case, so that the remaining nonaqueous electrolyte impregnates the interior of the electrode assembly after sealing, thereby making the pressure of the voids in the battery case lower than atmospheric pressure.

2. The manufacturing method according to claim 1, wherein sealing of the battery case is carried out at a timing such that the pressure of the voids in the battery case after sealing achieves a level not more than 90% of atmospheric pressure.

3. The manufacturing method according to claim 1, wherein the secondary battery has a negative electrode active material which is a graphite material.

4. The manufacturing method according to claim 1, wherein, after sealing of the battery case, at least one charging treatment is carried out in a state where the pressure of the voids in the battery case is lower than atmospheric pressure.

5. A nonaqueous electrolyte secondary battery obtained by the manufacturing method according to claim 1.

6. The manufacturing method according to claim 1, wherein the sealing of the battery case is carried out in not more than 60 seconds from when the voids within the battery case are exposed to atmospheric pressure during the releasing the pressure-reduced state.

* * * * *